3,073,681
CARBON BLACK PREPARATION
Ivan Ceresna, Borger, Tex., assignor to United Carbon Company, Inc. (Maryland), Houston, Tex., a corporation of Maryland
Filed Dec. 30, 1960, Ser. No. 79,908
9 Claims. (Cl. 23—209.4)

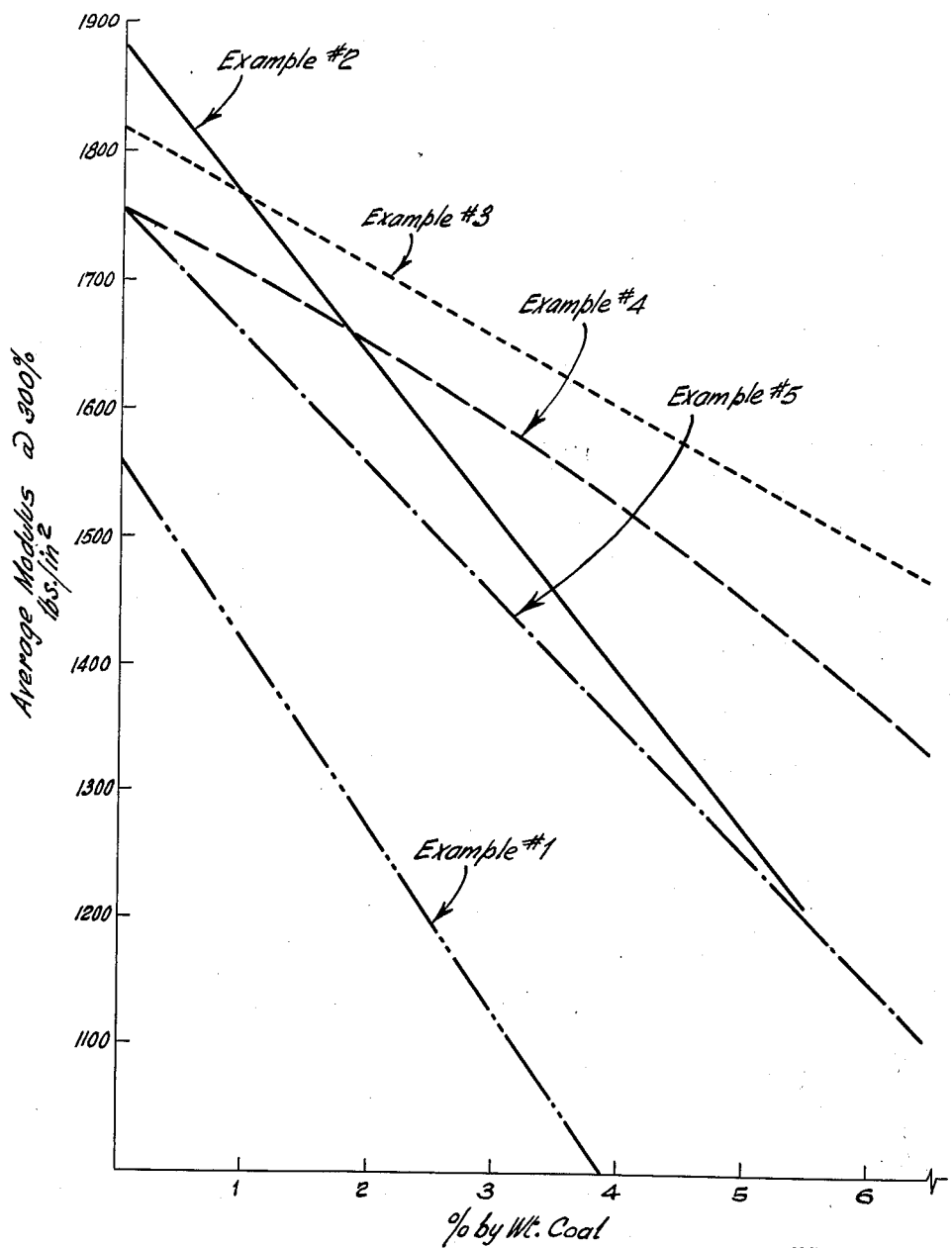

This invention relates to carbon black. More particularly, it relates to the preparation of carbon black. Still more particularly, it relates to an improved method for controlling the properties of carbon black produced by the thermal decomposition of hydrocarbons.

The preparation of furnace type carbon blacks by the thermal decomposition of hydrocarbons is well known. In general, this method of preparation comprises decomposing a hydrocarbon feedstock by the heat generated from the burning of a portion of the hydrocarbon and/or by subjecting it to heat generated by the substantially complete combustion of a second, and generally different, hydrocarbon fuel. Hydrocarbon feedstock composition, type of feedstock injection, hydrocarbon fuel feed rate, oxygen to fuel ratio and reaction time, among others, are variables which may influence the yield as well as the rubber properties of the carbon black produced. While all of the above described variables influence the rubber properties of carbon black to some extent, the hydocarbon feedstock employed appears to be one of the most, if not the most, important variable in this respect.

Thus, it has long been believed, for instance, that in order to modify the stress-strain properties of carbon black, especially modulus, without engaging in any form of after-treatment of the carbon black such as oxidation, it was necessary to replace the hydrocarbon feedstock. The disadvantages attendant such a practice are readily apparent. In the first place, obtaining a predetermined modulus by such a method is strictly a trial and error procedure. Secondly, the capacity to accurately maintain a predetermined modulus once it has been obtained, is necessarily dependent on a continued source of supply of the selected feedstock. Conversely, any desired change of modulus of the carbon black produced requires a replacement of the hydrocarbon feedstock. Aside from these factors, however, is the more important fact that any modulus variation obtained by feedstock replacement is marginal at best and is usually accompanied by an adverse affect on the tensile strength and elongation properties of the carbon black.

There has continued to remain, therefore, a demand for a method for modifying the rubber properties, particularly modulus, of furnace type carbon blacks. It is a principal object of this invention to provide such a method. It is a further object of this invention to provide a method for varying the modulus of furnace type carbon blacks which does not require the replacement of feedstock or an after-treatment of the carbon black. A still further object of this invention is to provide an improved method for producing furnace type carbon blacks which can be readily and accurately controlled so as to produce a carbon black of predetermined modulus. An additional object of this invention is to provide an improved method for producing furnace type carbon blacks which permits predetermined modulus variations over a range heretofore considered infeasible. Another object is to obtain such variations without adversely affecting other rubber properties. A still further object is to provide a method for producing controlled modulus carbon black which can be practiced on any hydrocarbon feedstock and in any furnace type carbon black reactor with little if any additional supervision to that normally observed.

In accordance with this invention, these objects have been met in a particularly effective manner. Surprisingly, it has now been found that the modulus of carbon black produced from a specific hydrocarbon feedstock bears a relationship to the amount of a modulus control agent according to this invention present during the conversion of the feedstock to carbon black. Thus, in contrast to prior practices in which it was necessary to completely change feedstocks in order to effect even a marginal modulus variation or to modify modulus by an after-treatment of the carbon black, it is now possible to widely vary the modulus of carbon black produced from any specific feedstock merely by varying the content of modulus control agent present during the conversion of the feedstock. More important, however, is that a predetermined modulus may be easily obtained and accurately maintained by the initial establishment and continued maintenance of the level of modulus control agent during conversion. Once the level of modulus control agent has been established for a predetermined modulus, the hydrocarbon feedstock is reacted in the presence thereof and the resultant carbon black-bearing reaction gases treated to recover the carbon black, all in an otherwise conventional manner.

It is a particular feature of the improved method of this invention that it is applicable to any of the procedures commonly employed in the production of furnace-type carbon black. Thus, while all furnace-type carbon blacks are, in general, produced by cracking a hydrocarbon using the heat generated by the combustion of a portion of the hydrocarbon and/or by the combustion of a second hydrocarbon, there are various different operational procedures by which this result is obtained. These various operational procedures differ primarily in the manner in which the reactants are introduced into the reactor and are well known to those skilled in the art. Such procedures as well as any others by which similar results are attained may be readily modified by the method of this invention to produce the improved results hereof.

Similarly, the hydrocrabon to be cracked in any of the various operating procedures to which the present improved method can be applied may be widely varied. Any hydrocarbon whether liquid or gaseous and whether derived from a petroleum or non-petroleum source may be employed. Such hydrocarbons may have widely varied aliphatic or aromatic contents. Representative of these hydrocarbons are methane, butane, pentane, gas oils, kerosene, gasoline boiling range hydrocarbons, heavy and light naphthas, residual and cycle oils derived from a wide variety of distillation and cracking and reforming operations and the like. By hydrocarbon feedstock as used herein, therefore, is meant any of the above. The hydrocarbon fuel employed in any of the various procedures to which the instant method can be applied may be the same as or different from the hydrocarbon feedstock. Usually, however, it will be natural gas when available. The combustion supporting gas employed in the above procedures may be varied but usually will be an oxygen-bearing gas such as air, oxygen-enriched air, oxygen or the like employed in amounts sufficient to complete combustion of the hydrocarbon fuel as is well known in the art.

The modulus control agent employed in the improved method of this invention is a normally solid carbonaceous material of high fixed carbon content. Particularly suited for use in the method of this invention are any of the several classes of coal including anthracite, bituminous, subbituminous and lignite. Also found especially suitable and as further representative of the solid carbonaceous modulus control agent hereof may be mentioned charcoal as well as both petroleum coke and coal coke. Exactly why the reaction of a hydrocarbon in the presence of the instant modulus control agent influences the modulus of the resultant carbon black is not clearly understood, nor is there any desire to restrict the method of this invention by any particular theory of operation. Nevertheless, it has been observed that the surpising influence on modulus is observed only when the modulus control agent is and remains a solid under normal conditions and is at least partially insoluble in liquid feedstock at reaction conditions. Thus, carbonaceous materials of a high fixed carbon content which do not exist in the solid state under normal conditions have been found to have little if any effect on modulus and, in fact, adversely affect other properties particularly tensile.

The amount of modulus control agent necessary to effect a desired change in modulus produced from a particular hydrocarbon feedstock will depend on both the feedstock and the modulus control agent employed. As indicated in the attached graph, however, a lowering of modulus is effected even when the illustrative feedstocks are converted in the presence of a substantially negligible amount of control agent. As further shown, the extent of modulus lowering becomes greater as the amount of agent is increased, although the relationship is not a true straight line function since, as the amount of control agent approaches a certain range, additional modulus decrease tends to become smaller. Depending upon the hydrocarbon feedstock and the modulus control agent, therefore, the change in modulus usually tends to become somewhat less pronounced within a range of some 30–70% decrease of the modulus of carbon black produced by converting the same hydrocarbon in the absence of control agent. The amount of control agent necessary to approach this apparent point of modulus leveling out cannot be easily and precisely defined as a general limitation in a numerical sense since it obviously will vary each time the feedstock and/or control agent is varied. Nevertheless, the amount of control agent necessary in most situations to reach this point will be less than about 50% by weight of the feedstock and generally not more than 15%, the usual range being about 3–7%. It is apparent from the illustrative graph that for any selected feedstock and modifying agent a predetermined modulus level can be easily established and precisely maintained.

In order to obtain the advantages of this invention and, as a practical matter to permit ready introduction thereof into the carbon black reactor, the solid carbonaceous material comprising the modulus modifying agent of this invention must be in a particulate form. While any sufficiently finely divided size range will serve in fulfilling the function of the modifying agent, from a practical consideration the size should be sufficiently uniform to permit ready injection into the reactor through injection means conventionally employed in the art and to permit smooth flow through usually flow measuring devices. To comply with these requirements, it has been found that a particle size of about 100% minus 200 mesh U.S. sieve series is especially suited. The particular manner in which the agent is introduced into the reactor may be varied. For instance, it may be injected separately from any of the reactants, or it may be introduced with one or more of the reactant streams, in which cases the reactant serves as a carrier for the modifying agent.

In the practice of the method of the present invention, modulus control is accurately varied and maintained without adverse affect on yield or on other rubber properties. This is particularly surprising in view of prior attempts to vary modulus all of which were usually accompanied by either poorer yields and/or poorer rubber properties particularly tensile strength. It is completely unexpected, therefore, in view of prior attempts to modify modulus, that the present invention permits lowering modulus to a predetermined level without adverse effect on yield or other rubber properties. In fact, when a reduction in modulus is effected in accordance with this invention, it is accompanied by higher tensile strength and better elongation. In addition, a reduction in oil adsorption which is considered a measure of structure accompanies a reduction in modulus.

The efficacy of the method of this invention is illustrated by the following examples in which feedstocks and modulus control agents having the following analyses and compositions are employed.

HYDROCARBON FEEDSTOCKS

| Analysis | Feedstock | | | | |
|---|---|---|---|---|---|
| | I | II | III | IV | V |
| Gravity, API @ 60° F | 16.5 | 8.6 | 1.4 | 5.0 | 6.7 |
| Viscosity, SU sec/@ ° F | 39.5/100 | 34/100 | 71.1/210 | 43.7/210 | 52.4/210 |
| Ash, weight percent | 0.000 | 0.000 | 0.029 | 0.019 | 0.008 |
| Conradson Carbon, percent | 0.30 | 0.06 | 13.6 | 7.12 | 7.92 |
| Sulfur, percent | 0.00 | 0.00 | 1.05 | 1.09 | 1.00 |
| Aromatics, percent | 45.56 | 75.10 | 79.14 | 73.09 | 66.16 |
| Asphaltenes, percent | 0.616 | 0.000 | 5.632 | 1.710 | 2.230 |
| Carbon, percent | 88.85 | 92.37 | 90.49 | 90.05 | 89.68 |
| Hydrogen, percent | 9.89 | 7.66 | 8.19 | 8.60 | 9.11 |
| Distillation: | | | | | |
| IBP, ° F., 760 mm | 390 | 438 | 396 | 407 | 537 |
| 5% | 468 | 465 | 610 | 572 | 675 |
| 10% | 491 | 476 | 695 | 609 | 705 |
| 20% | 507 | 484 | 729 | 658 | 742 |
| 30% | 523 | 492 | 763 | 694 | 771 |
| 40% | 541 | 498 | 792 | 723 | 801 |
| 50% | 566 | 503 | 833 | 752 | 821 |
| 60% | 582 | 509 | 868 | 788 | 844 |
| 70% | 622 | 517 | 922 | 837 | 858 |
| 80% | 666 | 536 | 985 | 894 | 906 |
| 90% | 699 | 585 | | 969 | 943 |

MODULUS CONTROL AGENTS

| Agent | Component | | |
|---|---|---|---|
| | Ash, Percent | Carbon, Percent | Hydrogen, Percent |
| Lignite Coal | 9.63 | 67.83 | 4.83 |
| Bituminous Coal A | 7.03 | 78.39 | 5.05 |
| Bituminous Coal B | 3.14 | 76.95 | 5.47 |
| Anthracite Coal | 13.55 | 78.71 | 3.23 |
| Charcoal | 2.19 | 83.0 | 3.14 |
| Petroleum Coke | 0.1 | 88.3 | 1.6 |
| Coal Coke | 12.89 | 83.16 | 0.52 |

In each example, natural gas is employed as the fuel and air as the oxygen-bearing combustion supporting gas, the feed rates of gas and air to the reactor being such as to produce complete combustion of the gas and maintain a temperature of about 2600° F. in the reaction chamber, as conventionally done, for reacting the hydrocarbon feedstock. Reaction is stopped by quenching and the carbon black-bearing gases subjected to conventional treatment to recover the carbon black.

*Examples 1–5*

Each of the hydrocarbon feedstocks I–V are reacted as above described to produce carbon black. Several runs are conducted for each feedstock. One run is a standard or blank conducted in the absence of a modulus control agent while the others are conducted in the presence of pulverulent bituminous coil B in amounts indicated in Table I. The coal is of 200–300 mesh U.S. sieve series and is suspended in the feedstock. The runs involving each feedstock are otherwise identical. The carbon blacks thus produced are then compounded according to the following formulation.

| Ingredient: | Parts |
|---|---|
| SBR–1500 | 100 |
| Carbon black | 50 |
| Softener | 5 |
| Zinc oxide | 5 |
| Sulfur | 2 |
| Stearic acid | 1.5 |
| Mercaptobenzothiazole | 0.8 |
| Diphenylguanidine | 0.25 |

The compositions are cured at 293° F. and tested. All tensile data are an average of 25, 40, 60, 90 and 120 minute cures, average modulus being used to construct the graph of the drawing.

TABLE I

| Run No. | Feedstock No. | Bituminous Coal B (percent by Wt.) | Tensile Data | | | Oil Factor |
|---|---|---|---|---|---|---|
| | | | Av. Modulus at 300% (p.s.i.) | Av. Tensile at Break (p.s.i.) | Av. Elongation at Break (percent) | |
| 1a | I | 0 | 1,560 | 2,710 | 470 | 142 |
| 1b | I | 3 | 1,120 | 3,040 | 520 | 97 |
| 2a | II | 0 | 1,880 | 2,600 | 385 | 144 |
| 2b | II | 3 | 1,510 | 2,860 | 460 | 120 |
| 3a | III | 0 | 1,820 | 2,660 | 395 | 135 |
| 3b | III | 3 | 1,660 | 2,820 | 430 | 120 |
| 3c | III | 6 | 1,490 | 2,880 | 460 | 110 |
| 4a | IV | 0 | 1,750 | 2,670 | 395 | 141 |
| 4b | IV | 3 | 1,590 | 2,920 | 440 | 120 |
| 4c | IV | 6 | 1,360 | 2,750 | 455 | 112 |
| 5a | V | 0 | 1,750 | 2,610 | 400 | 137 |
| 5b | V | 3 | 1,440 | 2,850 | 460 | 112 |

*Example 6*

The procedure of Example 1 is repeated replacing 3% bituminous coal B with 6% anthracite in one instance and 3% charcoal in a second instance. The modulus control agents are in particulate form having a particle size in the range of 200–300 mesh U.S. sieve series. The control agents are introduced into the reactor along with the process air. Results appear in Table II in which tensile data are averages of 25, 40, 60, 90 and 120 minute cures.

TABLE II

| Property | Modulus Control Agent | | |
|---|---|---|---|
| | None | 6% Anthr. Coal | 3% Charcoal |
| Average Modulus at 300% (p.s.i.) | 1,640 | 1,132 | 684 |
| Average Tensile at Break (p.s.i.) | 2,612 | 2,928 | 2,342 |
| Average Elongation at Break (percent) | 404 | 499 | 560 |

*Example 7*

The procedure of Example 6 is repeated replacing the anthracite coal and charcoal with bituminous coal A in the amounts indicated in Table III. The coal in a size range of 200–300 mesh U.S. sieve series is suspended in the hydrocarbon feedstock. The carbon blacks produced are compounded according to the following formulation.

Ingredients: Parts
 Smoke sheets _____ 100
 Zinc oxide _____ 3
 Carbon black _____ 45
 Antioxidant _____ 1
 Stearic acid _____ 3
 Pine tar _____ 3
 Sulfur _____ 2.75
 Accelerator _____ 0.35

The compositions are cured at 275° F. and tested. Results appear in Table III in which tensile data are averages of 20, 45, 70, 100 and 140 minute cures.

TABLE III

| Property | Modulus Control Agent | | |
|---|---|---|---|
| | None | 3% Bit. Coal A | 10% Bit. Coal A |
| Average Modulus at 300% (p.s.i.) | 1,886 | 1,386 | 1,104 |
| Average Tensile at Break (p.s.i.) | 3,960 | 4,374 | 3,934 |
| Average Elongation at Break (percent) | 494 | 601 | 628 |

*Example 8*

When the procedure of Example 7 is repeated replacing the bituminous coal with petroleum coke in one set of runs and with coal coke in a second set of runs, similar reductions in modulus are observed in each instance accompanied by similar improved tensile and elongation properties.

*Example 9*

The procedure of Example 1 is repeated replacing the bituminous coal B with bituminous coal A in the amounts shown in Table IV. Results appear in Table IV in which tensile data are averages of 25, 40, 60, 90 and 120 minute cures.

TABLE IV

| Property | Percent By Weight Bituminous Coal A | | | |
|---|---|---|---|---|
| | 0 | 2.5 | 5 | 10 |
| Average Modulus at 300% (p.s.i.) | 1,460 | 1,086 | 822 | 692 |
| Average Tensile at Break (p.s.i.) | 2,750 | 3,038 | 2,852 | 2,938 |
| Average Elongation at Break (percent) | 481 | 561 | 636 | 652 |

*Example 10*

The procedure of Example 4 is repeated using 4% and 12% by weight of the hydrocarbon feedstock. Results appear in Table V in which tensile data are averages of 25, 40, 60, 90 and 120 minute cures.

TABLE V

| Property | Percent By Weight of Bituminous Coal B | | |
|---|---|---|---|
| | 0 | 4 | 12 |
| Average Modulus at 300% (p.s.i.) | 1,678 | 300 | 1,244 |
| Average Tensile at Break (p.s.i.) | 2,762 | 2,870 | 3,054 |
| Average Elongation at Break (percent) | 441 | 497 | 532 |

*Example 11*

The procedure of Example 1 is repeated replacing the bituminous coal B with 10% bituminous coal A and 2% lignite. Results appear in Table VI in which tensile data are averages of 25, 40, 60, 90 and 120 minute cures.

TABLE VI

| Property | Modulus Control Agent | | |
|---|---|---|---|
| | None | 10% Bit. Coal A | 2% Lignite |
| Average Modulus at 300% (p.s.i.) | 1,714 | 814 | 1,528 |
| Average Tensile at Break (p.s.i.) | 2,824 | 3,158 | 2,830 |
| Average Elongation at Break (percent) | 428 | 627 | 457 |

The above examples clearly illustrate the influence that the modulus control agents of this invention have upon the modulus of carbon black produced from feedstocks reacted in the presence thereof. It is apparent that the effect that varying amounts of a particular modulus modifying agent have upon the modulus of carbon black produced from a particular feedstock may be readily determined. Accordingly, it is possible to consistently produce a carbon black of preselected or predetermined modulus from any feedstock using any modulus control agent merely by establishing and maintaining the appropriate predetermined condition. It is to be understood, of course, that the above examples are illustrative only and demonstrate the efficacy of this invention with respect to certain feedstocks and modulus control agents of particular compositions. It is just as applicable, however, to other carbon black feedstocks and solid carbonaceous modulus control agents whose compositions will vary depending upon their origin and/or subsequent treatment.

I claim:

1. In a process for preparing carbon black by thermally decomposing a fluid hydrocarbon feedstock in a reaction chamber, the improved method for obtaining a carbon black of preselected modulus which comprises: continuously introducing into said chamber a fluid hydrocarbon feedstock and a solid carbonaceous modulus control agent in particulate form selected from the class consisting of coal, coke and charcoal, the ratio of modulus control agent to hydrocarbon feedstock being such as to produce on thermal decomposition of said feedstock a carbon black of preselected modulus, and recovering carbon black of said preselected modulus from the resultant products of reaction.

2. A process according to claim 1 in which the solid carbonaceous modulus control agent is coal.

3. A process according to claim 1 in which the solid carbonaceous modulus control agent is coke.

4. A process according to claim 1 in which the solid carbonaceous modulus control agent is charcoal.

5. A process according to claim 1 in which the particle size of the solid carbonaceous modulus control agent is substantially all 100% minus 200 mesh.

6. A process according to claim 1 in which the hydrocarbon feedstock serves as a carrier for introducing the solid carbonaceous modulus control agent into the reaction chamber.

7. A process according to claim 1 in which the hydrocarbon feedstock and the solid carbonaceous modulus control agent are separately introduced into the reaction chamber.

8. A process according to claim 1 in which the amount of the solid carbonaceous modulus control agent is less than about 50% by weight of the hydrocarbon feedstock.

9. A process according to claim 1 in which the amount of the solid carbonaceous modulus control agent is about 3–7% by weight of said hydrocarbon feedstock.

References Cited in the file of this patent
UNITED STATES PATENTS

| | | |
|---|---|---|
| 1,285,363 | Pike | Nov. 19, 1918 |
| 1,625,236 | Bowman | Apr. 19, 1927 |
| 1,902,746 | Yunker | Mar. 21, 1933 |
| 1,939,587 | Adam et al. | Dec. 12, 1933 |
| 1,987,644 | Spear et al. | Jan. 15, 1935 |
| 2,781,246 | Goldtrap | Feb. 12, 1957 |
| 2,867,508 | Wood et al. | Jan. 6, 1959 |